United States Patent [19]
Agostini et al.

[11] Patent Number: 5,914,069
[45] Date of Patent: Jun. 22, 1999

[54] HYPOCHLORITE BLEACHING COMPOSITIONS

[75] Inventors: Francesco Agostini, Milan; Giuseppe Caire, Imperia, both of Italy

[73] Assignee: The Procter & Gamble Company, Cincinnati, Ohio

[21] Appl. No.: 08/640,968

[22] PCT Filed: Nov. 4, 1994

[86] PCT No.: PCT/US94/12746

§ 371 Date: Jan. 17, 1997

§ 102(e) Date: Jan. 17, 1997

[87] PCT Pub. No.: WO95/13416

PCT Pub. Date: May 18, 1995

[30] Foreign Application Priority Data

Nov. 11, 1993 [EP] European Pat. Off. .............. 93203153

[51] Int. Cl.$^6$ ...................................................... C01B 11/06
[52] U.S. Cl. ................................. 252/186.36; 252/187.25; 252/187.26; 8/108.1; 510/370; 510/373; 510/380; 510/477
[58] Field of Search ...................................... 510/373, 380, 510/370, 477; 8/108.1; 252/186.36, 187.25, 187.26

[56] References Cited

U.S. PATENT DOCUMENTS

| | | | |
|---|---|---|---|
| 3,966,649 | 6/1976 | Cheng | 510/477 |
| 4,120,650 | 10/1978 | Kappler et al. | 510/380 |
| 4,235,732 | 11/1980 | Beyer | 510/369 |
| 4,772,414 | 9/1988 | Marzec et al. | 252/186.36 |
| 4,902,803 | 2/1990 | Venturello et al. | 546/318 |
| 5,069,812 | 12/1991 | Humphreys et al. | 252/186.44 |
| 5,089,162 | 2/1992 | Rapisarda et al. | 252/187.34 |
| 5,380,458 | 1/1995 | Douglass | 252/186.36 |

*Primary Examiner*—Margaret Medley
*Attorney, Agent, or Firm*—Robert B. Aylor

[57] ABSTRACT

Liquid aqueous bleaching compositions are disclosed which comprise hypochlorite and a specific complexing agent or mixtures thereof selected from the group consisting of polycarboxylic acid derivatives of pyridine or the salts thereof. The compositions have a pH from 11–14 and preferably further comprise a calcium/magnesium precipitation system. The complexing agent counteracts the adverse affect which certain metal ions have on fabric strength and fabric color when hypochlorite bleaches are used in the presence of said ions.

11 Claims, No Drawings

HYPOCHLORITE BLEACHING COMPOSITIONS

TECHNICAL FIELD

The present invention relates to a liquid bleaching composition Which is suitable for laundry applications and household applications. More specifically, the compositions herein can be used in laundry applications as pre-wash bleaching compositions.

BACKGROUND OF THE INVENTION

Liquid bleaching compositions are well known in the art. Amongst the different bleaching compositions available, those relying on bleaching by hypochlorite are often preferred, mainly for whiteness performance reasons. See, for example, WO-88-05461 which discloses an aqueous composition comprising hypochlorite, sodium carbonate and sodium hydroxide and the use of said composition for removing stains from the fabrics. However, the drawbacks associated with the use of chlorine-based compositions are that said compositions may both damage and yellow fabrics.

It is therefore an object of the present invention to provide a hypochlorite-containing composition, suitable for use in laundry, whereby the yellowing of the fabrics is reduced or eliminated.

It is a further object of the present invention to provide a hypochlorite-containing composition, suitable for use in laundry, whereby fabric safety is improved.

It is another object of the present invention to provide a hypochlorite-containing composition, suitable for use in laundry, whereby the hypochlorite stability is improved. We have now found that the presence of some metal ions such as Ni, Co, Cu, Mn, Pd, Pt, Cr, Hg, Ir, and Fe adversely affects both hypochlorite bleaching performance and stability. It is believed that in the Washing environment said metal ions catalyze the attack of hypochlorite on fabrics with the generation of yellow oxidized species. Said metal ions also lead to reduced tensile strength of the fabrics, thereby reducing fabrics resistance. It is further believed that said metal ions are adsorbed per se on oxidized fabrics as colored species and catalyze the degradation of the brighteners adsorbed on fabrics generating thereby highly colored species on fabrics. Also, said metal ions stabilize colored pigments of enzymatic stains such as blood or grass. Furthermore, it is believed that said metal ions are detrimental for the performance of a hypochlorite composition as they tend to react with the hypochlorite present in said composition and thereby catalyze the decomposition of said hypochlorite.

Therefore we have found that it is essential that levels of said metal ions are controlled both in said composition as is and in the bleaching environment, thereby providing improved whiteness performance and safety to fabric and improved hypochlorite stability.

It has now been found that this can be achieved by formulating hypochlorite bleach compositions comprising a specific complexing agent or mixtures thereof selected from the group of polycarboxylic acid derivatives of pyridine or salts thereof. Said complexing agents are believed to be highly selective in binding the metal ions which are detrimental for both hypochlorite bleaching performance and stability.

We have also found that, in the preferred embodiment where the hypochlorite bleach compositions according to the present invention further comprise a Ca/Mg precipitation system, i.e. carbonate salts together with silicate salts, outstanding whiteness and fabric safety performance are provided. Indeed, it has surprisingly been found that the use of the specific complexing agent as herein defined, or mixtures thereof, together with said Ca/Mg precipitation system results in a synergistic effect on whiteness performance.

A further advantage of the compositions of the present invention is that in addition to their outstanding whitening action said compositions allow also good stain removal.

In the field of the dish washing compositions, EP-266 904 discloses compositions having a pH of from 7 to 12.5 which, among other ingredients, may comprise hypochlorite, from 5% to 50% by weight of the composition of pyridine derivatives as the builder, carbonate and silicate salts. No level of hypochlorite is disclosed.

SUMMARY OF THE INVENTION

The present invention encompasses an aqueous liquid bleaching composition having a pH of from 11.5 to 14, suitable to be used in diluted form, comprising from 0.1% to 10% by weight of the total composition, based on active chlorine, of an alkali metal hypochlorite, and from 0.01% to 5% by weight of the total composition of a complexing agent, or mixtures thereof, selected from the group of polycarboxylic acid derivatives of pyridine or salts thereof.

In a preferred embodiment, the compositions according to the present invention further comprise a Ca/Mg precipitation system, preferably carbonate salts together with silicate salts.

The present invention further encompasses a method of bleaching and Washing fabrics, thereby fabric whiteness is improved and Wherein an aqueous hypochlorite bleach composition having a pH of from 11.5 to 14, comprising a complexing agent or mixtures thereof as defined herein, is contacted with said fabrics In a preferred embodiment, the compositions used in said method further comprise a Ca/Mg precipitation system, preferably carbonate salts together with silicate salts.

DETAILED DESCRIPTION OF THE INVENTION

The compositions according to the present invention are stable aqueous bleaching compositions which comprise a complexing agent or mixtures thereof as herein defined.

By stable it is meant herein that the hypochlorite bleach composition of the present invention should not undergo more than 25% loss of available chlorine after 7 days of storage at 50° C. +/−0.5° C. The % loss of available chlorine may be measured using the method described, for instance, in "Analyses des Eaux et Extraits de Javel" by La chambre syndicale nationals de L'eau de Javel et des Produits connexes, pages 9–10 (1984) Said method consists in measuring the available chlorine in the fresh compositions, i.e. just after they are made and in the same compositions after 7 days storage at 50° C.

As a first essential feature, the compositions of the Present invention comprise hypochloritse various forms of alkali metal hypochlorite are commercially available It is preferred herein to use sodium hypochlorite. compositions according to the present invention comprise a bleaching amount of alkali metal hypochlorite Which typically represents from 0.1% to 10% by weight of the total composition, based on active chlorine of alkali metal hypochlorite Preferred compositions herein comprise from 3% to 6% of alkali metal hypochloritse.

As a second essential feature, the compositions according to the present invention comprise a complexing agent selected from the group of polycarboxylic acids of pyridine having one of the following formulas:

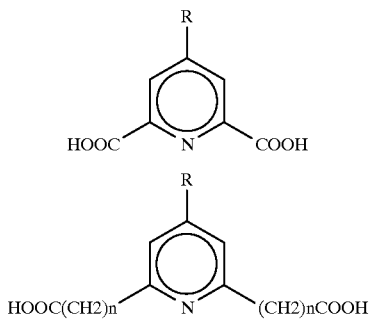

and salts of said acids R is hydrogen, a halogen &tom, & hydroxyl group, an amino group, a carboxylic group or a short-chain alkyl group .(C1-C4) and n is 1 or 2 and mixtures thereof. Preferred herein are the polycarboxylic acid derivatives of pyridine selected from the group of dipicolinic acid (2,6-pyridendicarboxylic acid) and derivatives thereof obtained by substitution of the hydrogen in paEra position with, a halogen, a carboxylic group or a short-chain alkyl group (C1-C4). The compositions of the present invention comprise from 0.01% to 5% by weight of the total composition of a complexing agent selected from the group of polycarboxylic acid derivatives of pyridine or salts thereof, or mixtures thereof, preferably from 0.01% to 4%, more preferably from 0.01% to 3% and most preferably from 0.02% to 2%.

Said complexing agents to be used herein are stable to hypochlorite and to high alkalinity. By "stable to hypochlorite and to high alkalinity" it is meant herein that the whiteness performance obtained with a composition of the present invention as made and the same composition after a period time of two months is the same. The method used to determine said whiteness performance is hereinafter described in the examples.

As a third essential feature, the compositions according to the present invention have a pH as is of from 11.5 to 14, preferably from 12 to 14. Suitable means to achieve such a pH value include potassium and sodium hydroxide.

The compositions of the present invention may further comprise a Ca/Mg precipitation system. Particularly useful to be used herein are silicate or carbonate salts, or mixtures thereof. The preferred alkali metal salts of silicate and carbonate are sodium silicate and sodium carbonate, both of which are commercially available, or mixtures thereof. Preferred compositions herein use a mixture of sodium carbonate and sodium silicate. Preferred compositions herein comprise up to 5% of by weight of the total composition of sodium carbonate, preferably from 0.2% to 5%, more preferably from 0.5% to 3%, and up to 3% by weight of the total composition of sodium silicates preferably from 0.02% to 3%, more preferably from 0.04% to 3%. It has been found that said carbonate salts and silicate salts eliminate the metal impurities from the washing solution.

Indeed, silicate and carbonate salts bind with Ca and Mg present in the washing solution and precipitate as Ca/Mg silicate and Ca/Mg carbonate. this strongly reduces Ca and Mg content in solution, so that the action of the completing agent of the present invention is even more specific.

Said silicate or carbonate salts allow also buffering of the pH of the present compositions throughout use. It is also suspected that the buffering of the hypochlorite compositions of the present invention reduces harshness to hands. Other precipitation/buffering systems could be conveniently used herein such as sodium borate and sodium The preferred compositions herein, which comprise both a complexing agent selected from the group of polycarboxylic derivatives of pyridine or salts thereof, or mixtures thereof, and a Ca/Mg precipitation system, i.e. carbonate salts together with silicate salts, provide improved fabric whiteness. By "improved fabric whiteness" it is meant herein that the whiteness on fabric achieved by using the hypochlorite compositions of the present invention is improved compared to the whiteness obtained by using hypochlorite compositions without any specific complexing agent as herein described. Indeed, it has been found that a synergistic effect on the whiteness performance is associated with the use of hypochlorite bleach compositions comprising said complexing agent or mixtures thereof together with said Ca/Mg precipitation system.

The compositions according to the present invention may further comprise optional ingredients including bleach-stable surfactantse organic or inorganic alkalise perfumes, bleach-stable perfume solubilizer, pigments, dyes, optical brighteners, solvents, and the like.

The compositions according to the present invention are used in diluted form in laundry application. The expression "use in diluted form" herein includes dilution by the user, which occurs for instance in hand laundry applications, as well as dilution by other means, such as in a washing machine. Typical dilution levels are of from 0.5% to 20% for hand laundry application and 0.1% to 10% in a washing machine. Due to the Ca/Mg precipitation system used herein which is also a buffer system, the pH of a composition according to the present invention remains constant throughout use, i.e. the pH of a diluted composition is buffered from the moment the dilution is completed and until said hypochlorite bleaching composition is started to be rinsed away.

The present invention further encompasses a method of bleaching and washing fabrics wherein an aqueous hypochlorite composition having a pH of from 11.5 to 14 which comprises a complexing agent or mixtures thereof as defined herein is contacted with said fabrics. The compositions used in said method of bleaching and washing fabrics may further comprise a Ca/Mg precipitation system, preferably carbonate salts together with silicate salts. Said method according to the present invention improves the whiteness on fabrics, i.e. reduces yellowing due to the actions of heavy metal ions on fabrics.

More specifically, the method of bleaching fabrics according to the present invention comprises the steps of first contacting said fabrics with a composition according to the present invention in diluted form, then allowing said fabrics to remain in contact with said composition, for a period of time sufficient to bleach said fabrics, typically 5 to 60 minutes, preferably 5 to 30 minutes, then rinsing said fabrics in water to remove said composition. If said fabrics are to be washed, i.e. with a conventional composition comprising at least one surface active agent, it is preferred to perform the method herein before said fabrics are washed. Indeed, it has been observed that bleaching said fabrics with the compositions according to the present invention prior to washing them with a detergent composition provides superior whiteness and stain removal with less energy and detergent than if said fabrics are washed first, than bleached. Accordingly, said method according to the present invention further comprises a subsequent stop where said fabrics are washed with a detergent composition comprising at least one surface active agent.

The present invention will be further illustrated by the following examples.

EXAMPLE 1

The following examples will illustrate the present invention. Said compositions are made by mixing the listed ingredients in the listed proportions:

| Compositions | 1 | 2 | 3 |
|---|---|---|---|
| Sodium hypochlorite | 5.0 | 5.0 | 5.0 |
| Sodium hydroxide | 0.7 | 0.7 | 0.7 |
| Sodium carbonate | 1.0 | 1.0 | 1.0 |
| Dipicolinic acid | 0.5 | 0.5 | / |
| Sodium silicate | 1.0 | / | / |
| pH | 13 | 13 | 13 |
| Water & minors | | 100% | |

Compositions 1 and 2 are representative of the present invention. Composition 1 differs from composition 2 in that composition 2 does not contain silicate salts Composition 3, is a hypochlexrite bleach composition taken as a reference.

A single tracer launderometer test was carried out. The test was performed in a stainless steel vassal. First 110 g of a composition of the present invention was diluted in 6 kg of tap water. From this solution samples of 500 g were taken and heated at 40° C. Then, the tracers (white cotton fabric and stained tracers) were added into these samples. The vessel was then sept under agitation for 20 minutes. At the end of the washing cycle the tracers were rinsed and dried. Then the tracers were evaluated by visual grading.

The table below lists the results obtained for compositions 1 and 2, versus composition 3.

| | Stain removal | Whiteness single cycle | Whiteness cumulative cycle |
|---|---|---|---|
| Composition 1 vs 3 | 0.5 | 1.3S | 1.6S |
| Composition 2 vs 3 | -0.3 | 0.2S | 1.0S |

Where:
Results are expressed on a 0 to 3 performance scale.
S identifies statistically reproducible results.
Cumulative whiteness is measured with up to 8 repetitive washing cycles.

Comments:

The data clearly shows the unexpected whiteness improvement delivered by the compositions of the present invention comprising dipicolinic acid as the complexing agent, especially after several wash cycles copositions 1 and 2). Said data surprisingly shows the synergistic effect of the use of dipicolinic acid together With sodium silicate, on both the whiteness performances and the stain removal performance (composition 1).

Stability test carried out with the method hereinbefore described shows that compositions 1 and 2 are stable. For example, composition 1 undergoes only 17% loss of available chlorine after 7 days of storage at 50° C.

What is claimed is:

1. A stable aqueous liquid bleaching composition having a pH of from 11.5 to 14 suitable to be used in diluted form, comprising from 0.1% to 10% by weight of the total composition, based on active chlorine, of an alkali metal hypochlorite characterized in that said composition further comprises from 0.01% to 5% by weight of a complexing agent or mixtures thereof selected from the group of polycarboxylic acid of pyridine having one of the following formulas:

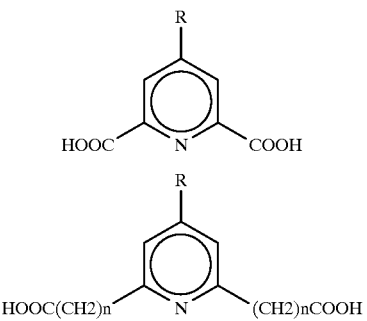

or salts of said acids, wherein

R is hydrogen, a halogen atom, a hydroxyl group, an amino group, a carboxylic group or a short-chain alkyl group ($C_1$–$C_4$) and n is 1 or 2, or mixtures thereof.

2. A method of bleaching fabrics comprising the steps of 1) diluting an aqueous liquid bleaching composition having a pH of from 11.5 to 14, comprising from 0.1% to 10% by weight of the total composition based on active chlorine of an alkali metal hypochlorite and from 0.01% to 5% by weight of a complexing agent or mixtures thereof to a concentration of from 0.1% to 20%, 2) contacting said fabrics with said diluted solution, and 3) then rinsing said fabrics, whereby fabrics whiteness is improved, characterized in that said complexing agent is selected from the group consisting of polycarboxylic acids of pyridine having one of the following formulas:

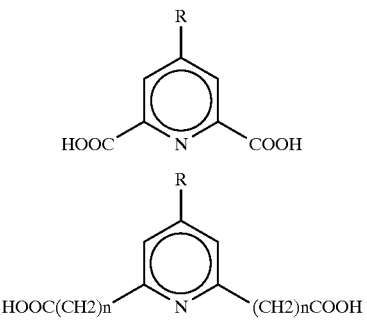

or salts of said acids wherein

R is hydrogen, a halogen atom, a hydroxyl group, an amino group, a carboxylic group or a short-chain alkyl group ($C_1$–$C_4$) and n is 1 or 2 or mixtures thereof.

3. A composition of claim 1, wherein R is hydrogen, a halogen atom, an amino group, a carboxylic group or a short chain alkyl (C1–C4).

4. A method according to claim 2 wherein said composition comprises from about 0.01% to about 3% by weight of the total composition of said complexing agent or mixtures thereof.

5. A composition according to claim 1 wherein said composition comprises from 0.01% to 3% by weight of the total composition of said complexing agent or mixtures thereof.

6. A composition according to claim 1 wherein in said composition, said complexing agent is selected from the group of dipicolinic acid (2,6-pyridendicarboxylic acid), derivatives thereof or mixtures thereof.

7. A composition according to claim 1 wherein said composition has a pH of from 12 to 14.

8. A composition according to claim 1 wherein said composition further comprises a Ca/Mg precipitation system comprising a mixture of the alkali metal salts of silicate and carbonate wherein the amount of silicate salt is from 0.02% to 3% and the amount of carbonate salt is from 0.2% to 5%.

9. A method according to claim 2 wherein said composition, said complexing agent is selected from the group of dipicolinic acid (2,6-pyridendicarboxylic acid), derivatives thereof or mixtures thereof.

10. A method according to claim 2 wherein said composition further comprises a Ca/Mg precipitation system comprising from 0.2% to 5% by weight of the total composition of sodium carbonate and from 0.02% to 3% by weight of the total composition of sodium silicate.

11. The method of claim 2, wherein R is hydrogen, a halogen atom, an amino group, a carboxylic group or a short chain alkyl (C1–C4).

* * * * *